United States Patent [19]
Yikai et al.

[11] Patent Number: 5,034,032
[45] Date of Patent: Jul. 23, 1991

[54] AIR CLEANER AND AIR FILTER

[75] Inventors: Kunio Yikai, Tokyo; Hiroaki Kanazawa, 1-2-15 Higashi-Tabata, Kita-ku, Tokyo, both of Japan

[73] Assignees: Hiroaki Kanazawa, Shibuya; Katsumune Shiraishi, both of Tokyo, Japan

[21] Appl. No.: 361,538

[22] Filed: Jun. 5, 1989

[30] Foreign Application Priority Data

Dec. 21, 1988 [JP] Japan ................... 63-322926

[51] Int. Cl.$^5$ ............................................. B03C 3/00
[52] U.S. Cl. .......................................... 55/124; 55/126; 55/136; 55/152
[58] Field of Search ............... 55/124, 126, 131, 136, 55/138, 151, 152, 154

[56] References Cited

U.S. PATENT DOCUMENTS

| 3,883,328 | 5/1975 | Spain | 55/131 |
| 3,988,131 | 10/1976 | Kanazawa et al. | 55/126 |
| 4,133,652 | 1/1979 | Ishikawa et al. | 55/126 |
| 4,244,710 | 1/1981 | Burger | 55/126 |

Primary Examiner—Jay H. Woo
Assistant Examiner—C. Scott Bushey
Attorney, Agent, or Firm—Jordan and Hamburg

[57] ABSTRACT

An air cleaner and an air filter for removing charged ozone in the air includes an air filter having a carbon filter for adsorbing charged ozone in an air path of the air cleaner and converting ozone adsorbed in the carbon filter to oxygen and carbon dioxide by a chemical reaction. A positive voltage is applied to the carbon filter.

6 Claims, 10 Drawing Sheets

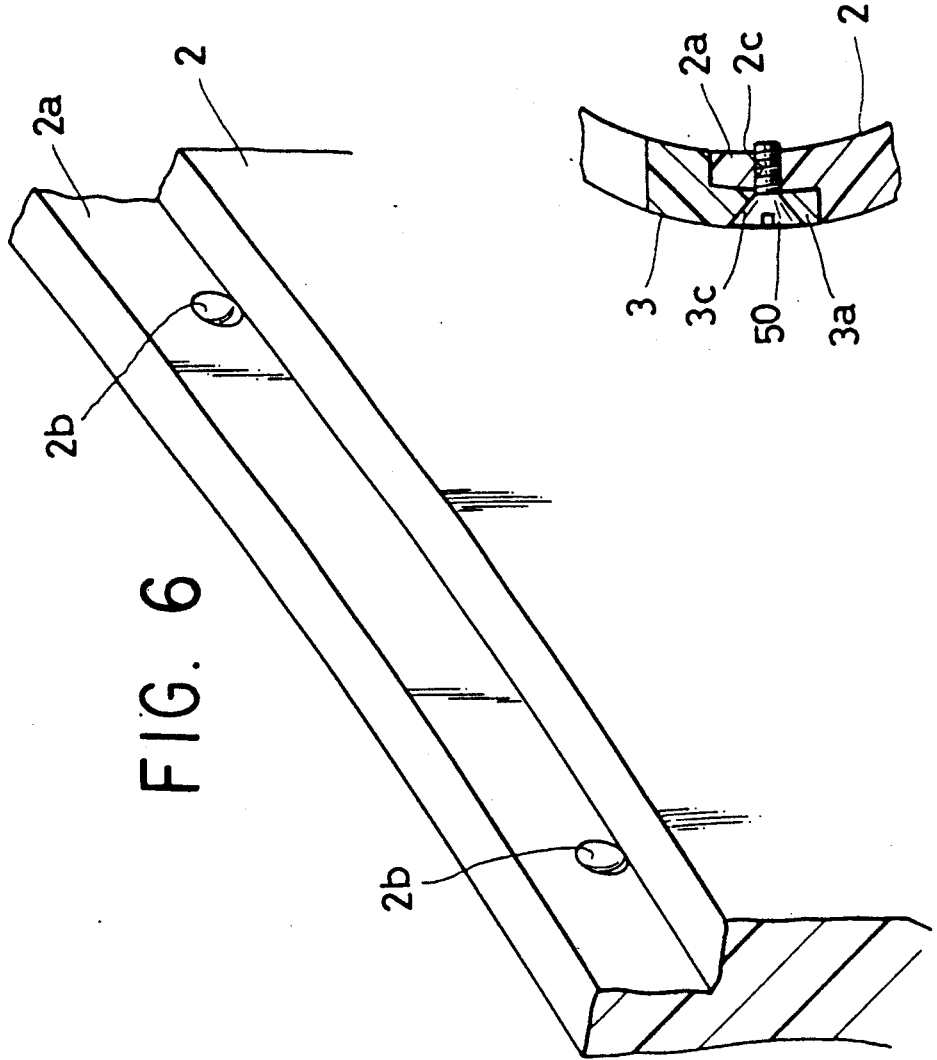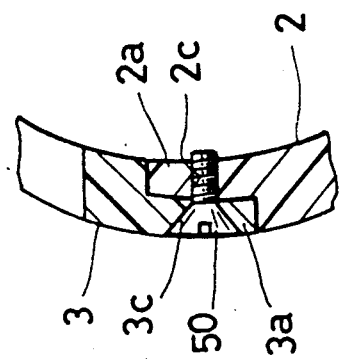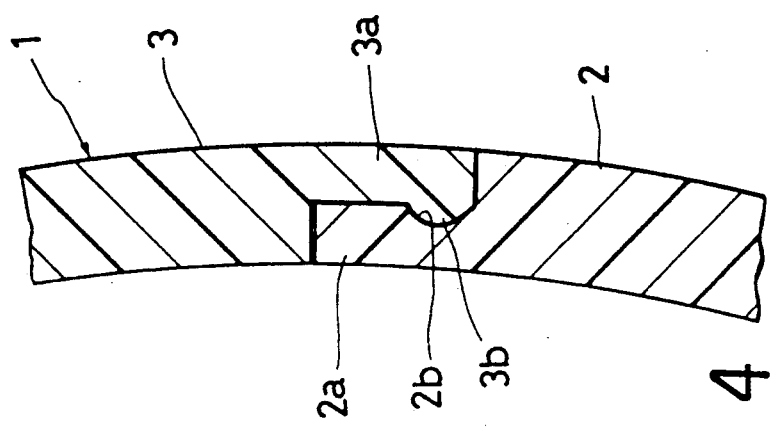

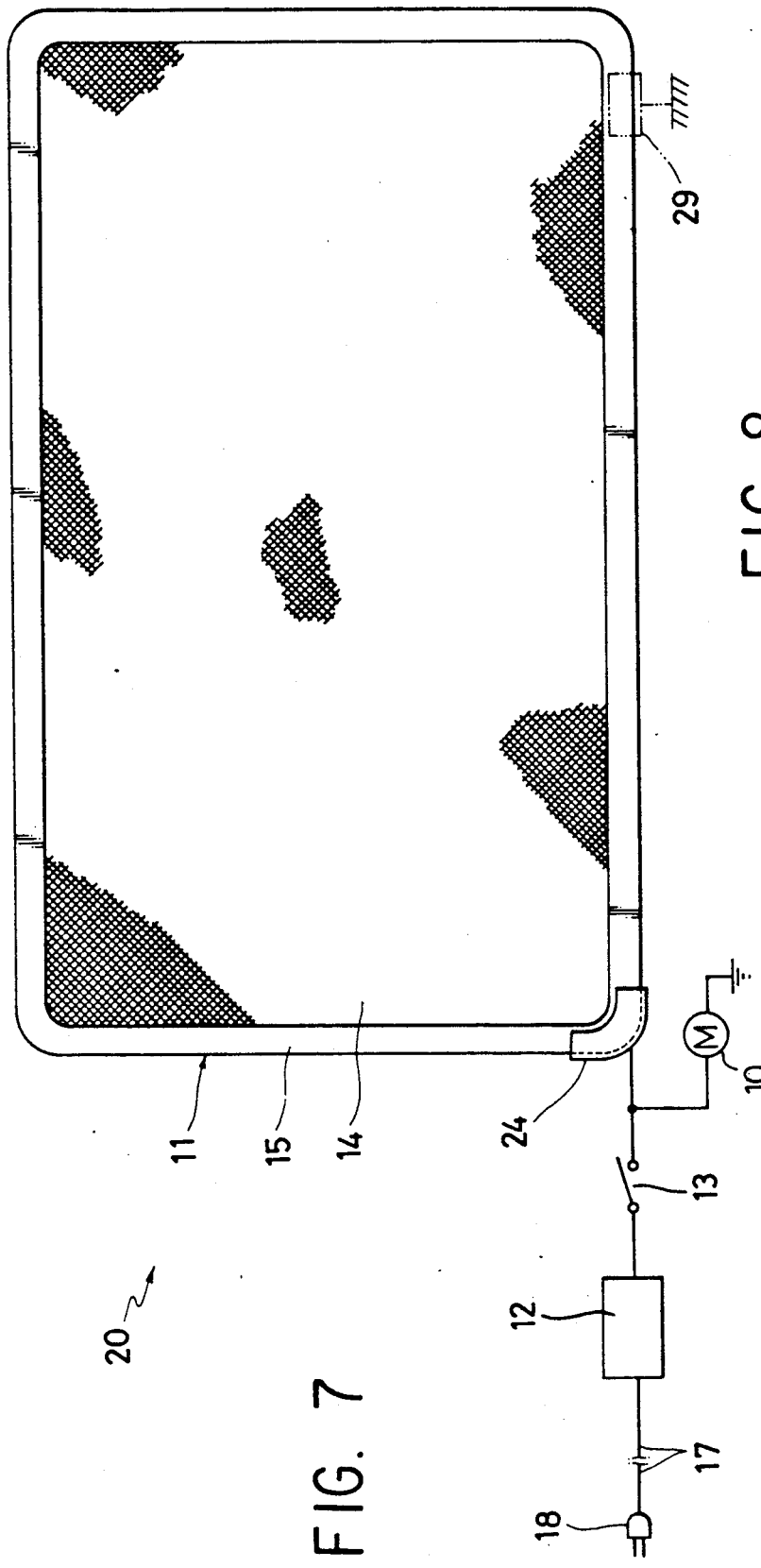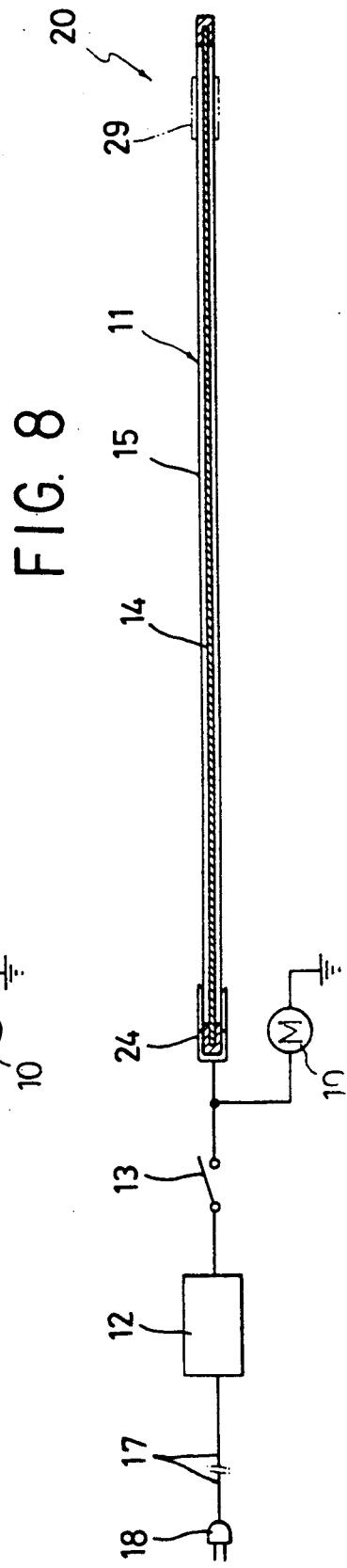

AIR CLEANER AND AIR FILTER

BACKGROUND OF THE INVENTION

This invention relates to an air cleaner and an air filter capable of reducing ozone.

Up to now, it has been recognized that ozone is generated from an apparatus making use of high voltage.

Ozone should be removed as it exerts a baneful influence upon the human body in case when a large quantity of ozone is existing in the air, however at the present time a means effective for removing ozone has never been invented.

Accordingly, under the present conditions, ozone is removed by ventilating a room by an apparatus making use of high voltage.

SUMMARY OF THE INVENTION

It is an object of this invention to provide an air cleaner which can remove ozone efficiently in a short time from the air containing charged ozone.

Further, it is an object of this invention to provide an air filter which can remove ozone efficiently in a short time from the air containing charged ozone by mounting in a duct of an air conditioning system and the like.

The above and further objects and novel features of this invention will more fully appear from the following detailed description when the same is read in connection with the accompanying drawing. It is to be expressly understood, however, that the drawing is for purpose of illustration only and is not intended as a definition of the limits of this invention.

BRIEF DESCRIPTION OF THE DRAWINGS

FIGS. 4 and 5 are explanatory views showing the state of engagement of each engaging parts of a lower case and an upper case of the embodiment of FIG. 1.

FIG. 6 is an explanatory view of an engaging part in lower case of the embodiment of FIG. 1.

FIGS. 7 and 8 are explanatory views of an air filter.

DESCRIPTION OF THE PREFERRED EMBODIMENT

Figure 1:
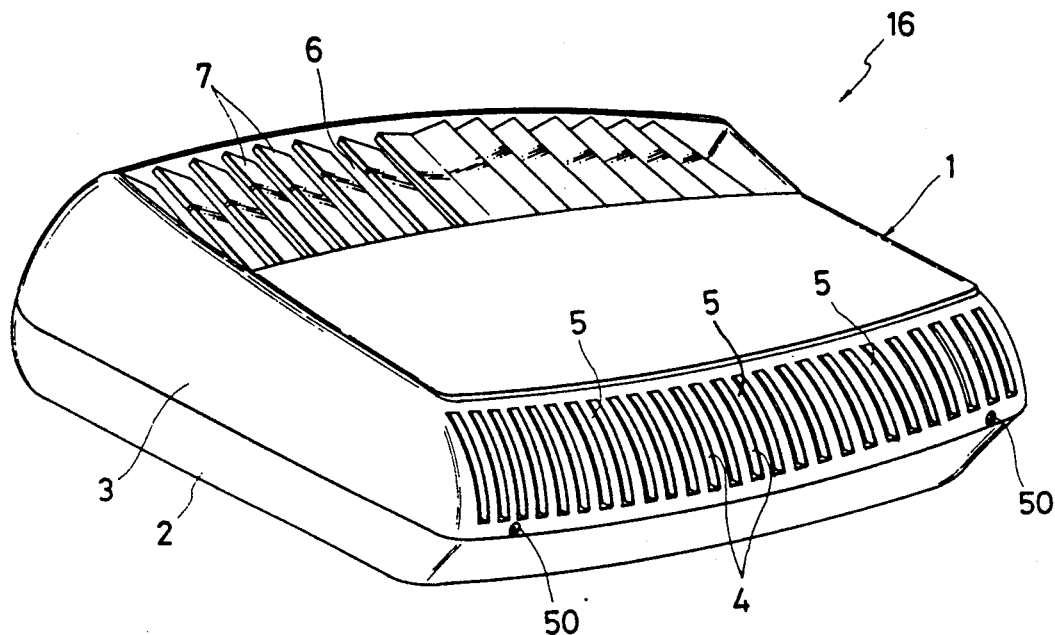
FIG. 1 is a perspective view showing an embodiment of this invention.
Figure 2:
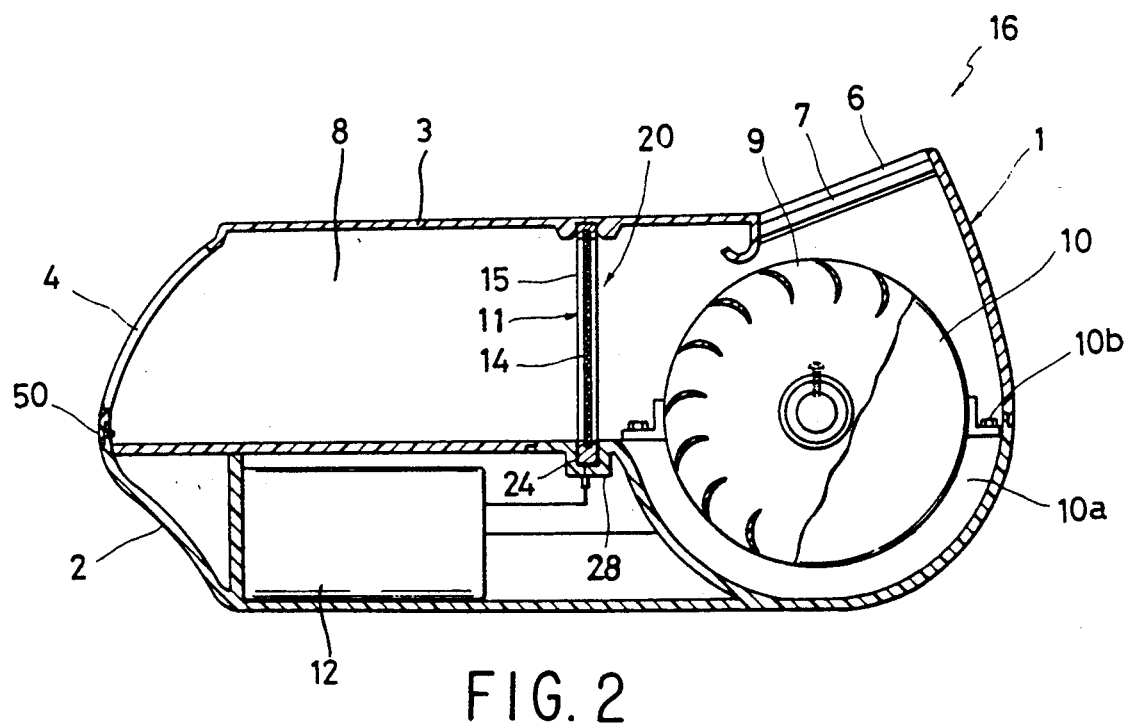
FIG. 2 is a longitudinal sectional view of the embodiment of FIG. 1.

This invention will be described in detail hereinafter with the embodiments shown in figures.

Referring first to the embodiment shown in FIGS. 1-8 inclusive, 1 indicates a case body which comprises a lower case 2 made from synthetic resin material and an upper case 3 made from synthetic resin material which is able to cover an upper opening of the lower case 2.

In a segment for engagement 2a at the upper end of the rear side of the lower case 2, 2 cavities for engagement 2b, 2b as shown in FIG. 6 are formed.

In a segment for engagement 3a at the lower end of the rear side of the upper case 3, 2 protrusions for engagement 3b, 3b which engage respectively with the cavities for engagement 2b, 2b of the lower case 2 are formed as shown in FIG. 4.

Further, in the segment for engagement 2a at the upper end of the front side of the lower case 2, 2 screw holes 2c, 2c are formed as shown in FIG. 5 and also in the segment for engagement 3a at the lower end of the front side of the upper case 3, holes 3c, 3c for inserting machine screws 50, 50 which are screwed in the screw holes 2c, 2c are formed as shown in FIG. 5.

4 indicates an air inlet having a number of longitudinal bars 5 formed in front of the upper case 3.

6 indicates an air outlet having a number of fins 7 formed at the top surface of the rear side of the upper case 3.

8 indicates an air path formed within the case body 1 for communication from the air inlet 4 to the air outlet 6.

Figure 3:
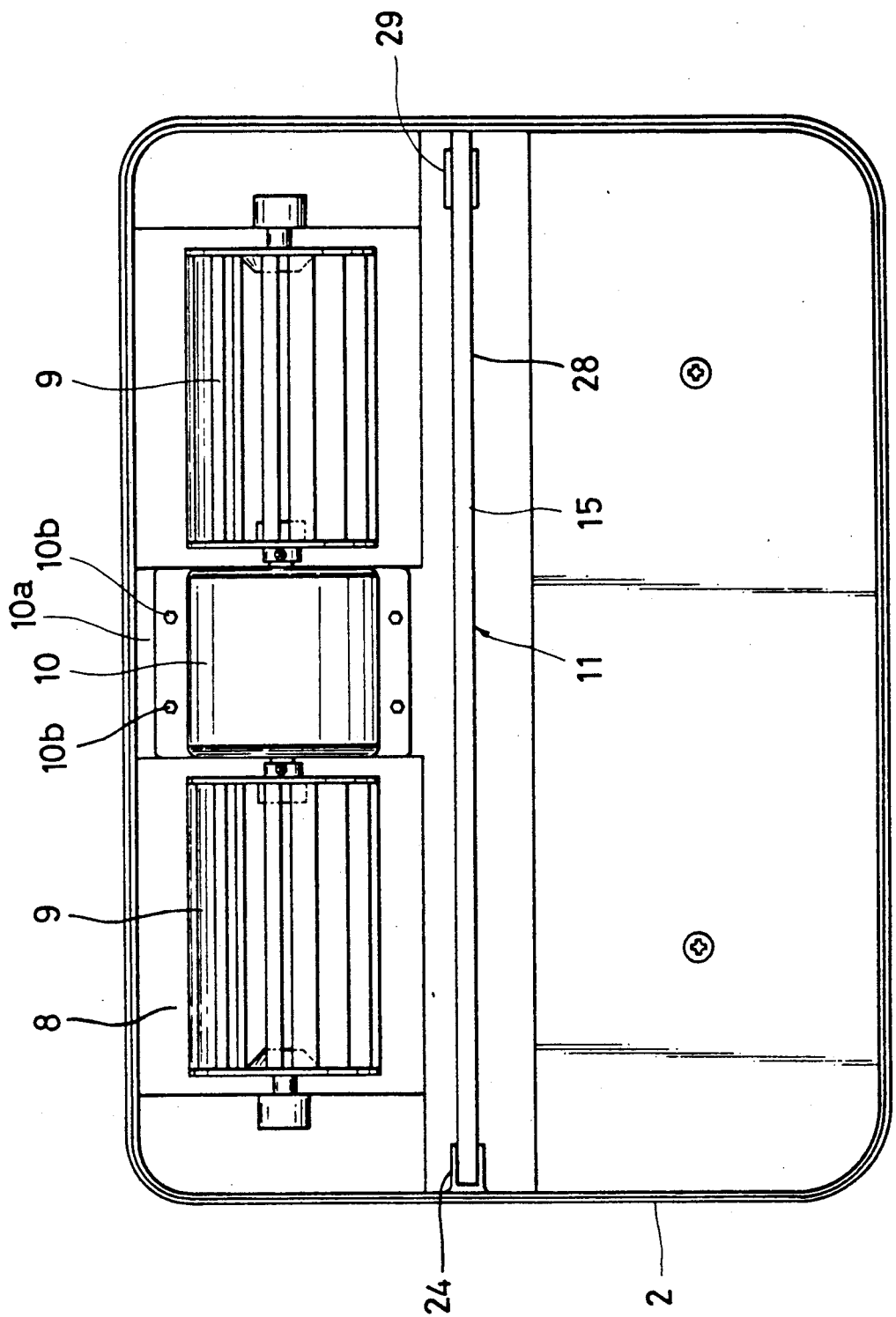
FIG. 3 is a plan view of the embodiment of FIG. 1 showing the state in case of removing an upper case.

9, 9 indicate fans mounted within the air path 8 near by the air outlet 6 as shown in FIG. 3. These fans 9, 9 are mounted to be driven by an electric motor 10 secured by means of a plurality of bolts 10b to a motor mount 10a in nearly central part of the lower case 2.

11 indicates a carbon filter body mounted removably on a filter mount 28 formed in the lower case 2 and the upper case 3 within the air path 8, screening the air path 8 to be able to keep air flow therethrough. This carbon filter body 11 can be electrically connected to each of a plug socket 24 and an earth terminal 29 mounted at the lower end of a filter mount 28 formed in the lower case 2 by inserting it into the filter mount 28.

12 indicates an AC adapter as a voltage impressing apparatus mounted in the lower case 2 which impress predetermined positive voltage such as 6 volts, 12 volts, 24 volts, etc. to the carbon filter body 11. A carbon filter 20 comprises the AC adapter 12 and the carbon filter body 11.

Further, the carbon filter body 11 comprises a filter base 14 formed out of fibrous carbon, carbon compound metal or activated carbon and an outer frame made of conductive metal sheet for covering the periphery of the filter base 14.

13 indicates a switch to turn on or off for impressing positive voltage to the electric motor 10 and the carbon filter body 11.

An air cleaner 16 arranged as described is connected to a commercial electric source by inserting a plug 18 connected via a cord 17 with an AC adapter 12 into a plug socket connected to a commercial electric source.

After that, an electric motor 10 is started by turning switch 13 on and then fans 9, 9 run. By running of these fans 9, 9, air is sucked from an air inlet 4, passes through within an air path 8 and is exhausted from an air outlet 6.

Since positive voltage is impressed on a carbon filter body 11 at this time, charged ozone ($O_3$) in the air passing through the carbon filter body 11 changes to oxygen ($O_2$) and carbon dioxide ($CO_2$) by chemical reaction with carbon of the carbon filter body 11.

Further, in case ozone ($O_3$) in the air passing through a carbon filter body 11 is charged with electricity, ozone attaches to a carbon filter body 11 in the state of absorption and, therefore, charged ozone is surely caught without passing through a carbon filter body 11 and also removed by changing from ozone ($O_3$) to oxygen ($O_2$) and carbon dioxide ($CO_2$) by chemical reaction with carbon of the carbon filter body 11.

For this reason, the air from which ozone is removed is exhausted from an air outlet.

Having described our invention as related to the embodiment in case when a case body 1 of horizontal type is used, it is our intention that the invention be not limited by any of the details of description, unless otherewise specified, but the same effect may be obtained in case when a case body of vertical type is used.

Now the different embodiments of this invention shown in FIGS. 9-19 inclusive, will be described. Further, in the description of these embodiments, duplicate description for the components identical to the components of the embodiments of this invention will be omitted by giving identical symbols to identical components.

Figure 9:
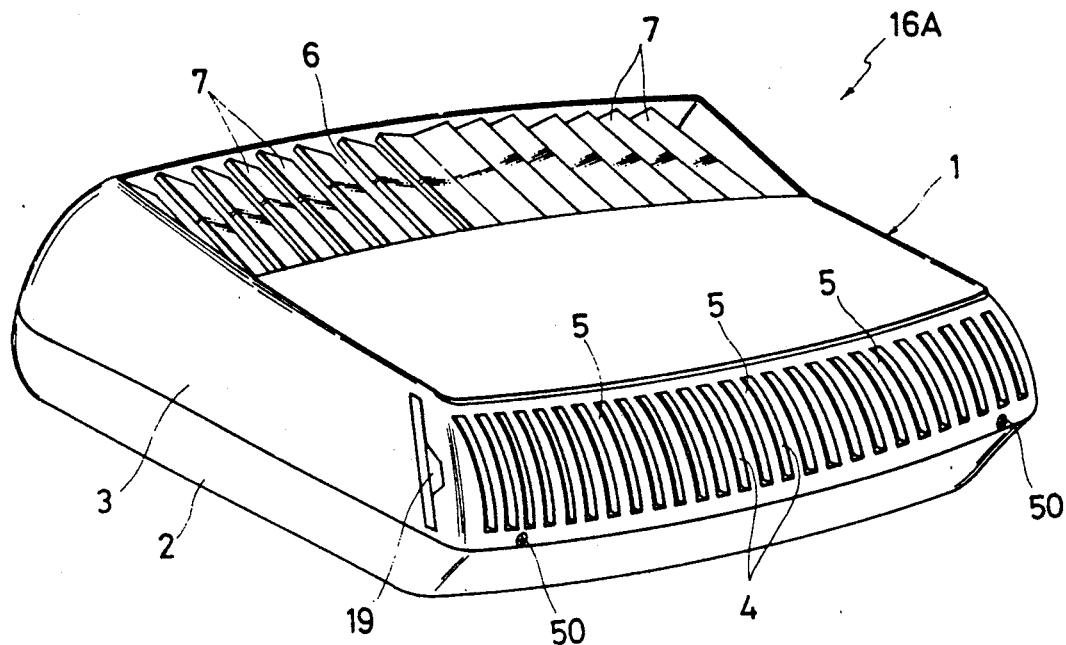
FIGS. 9 and 10, FIGS. 11-13 inclusive, FIGS. 14-17 inclusive.
Figure 10:
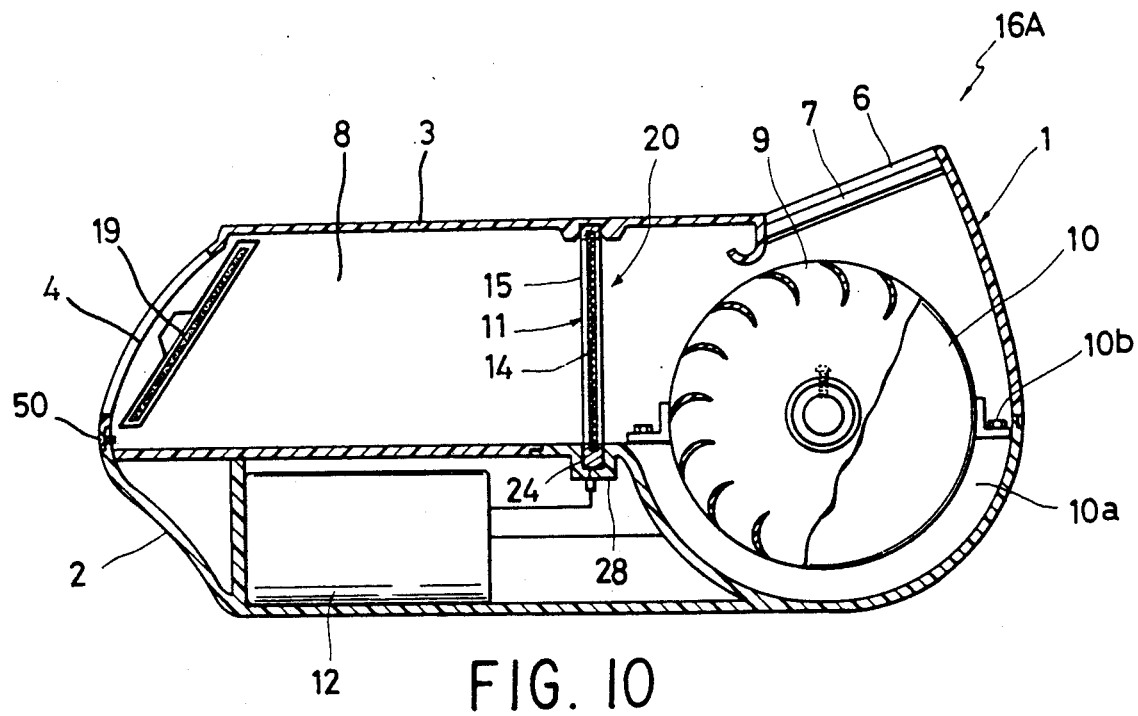

In the embodiments shown in FIGS. 9 and 10, the significant difference from the embodiments of this invention is that a dust removing filter 19 for removing dust in the air is mounted removably at the position of an air inlet 4. It is possible to remove dust and ozone in the air efficiently by an air cleaner 16A arranged as described.

Figure 11:
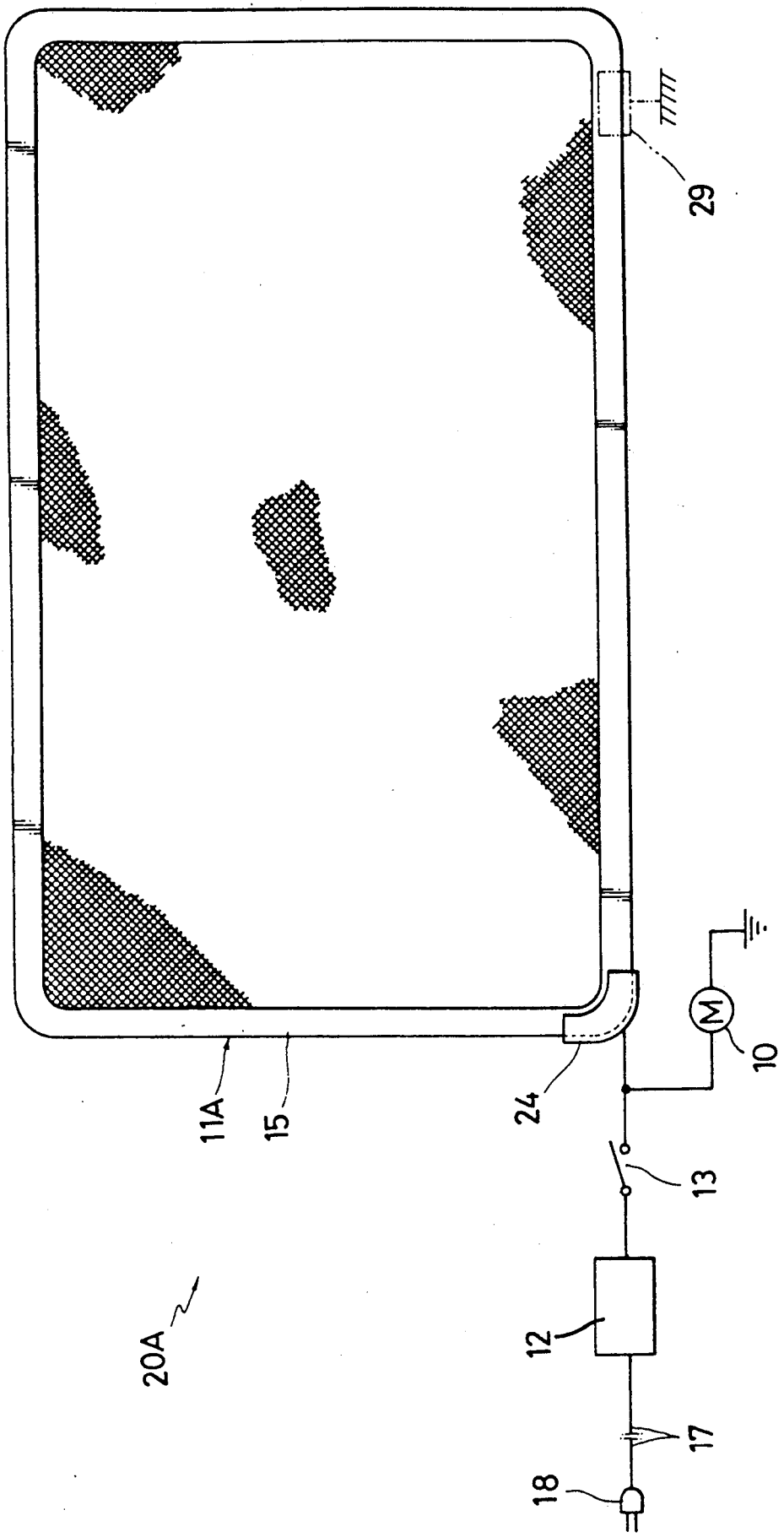
Figures 12, 13:
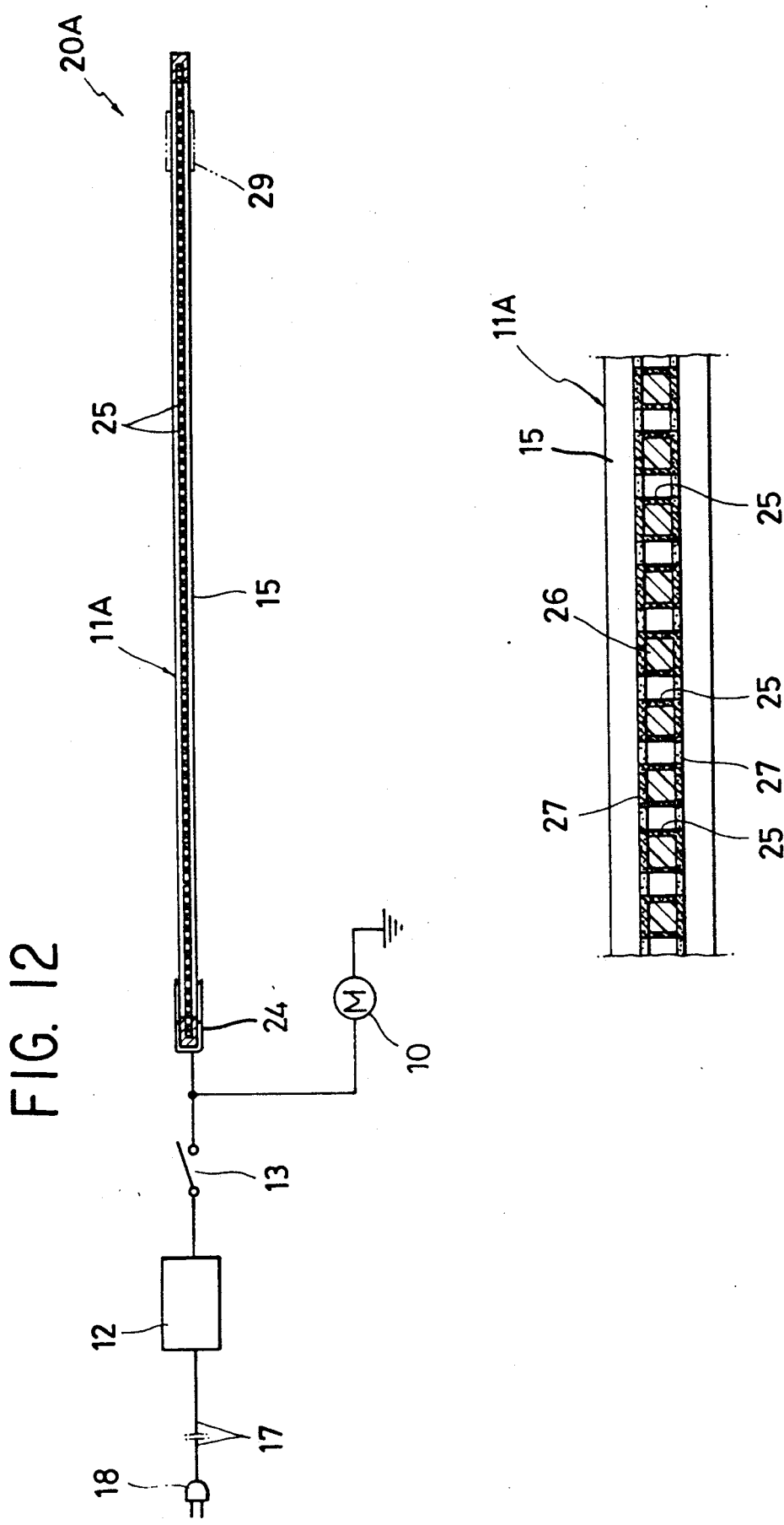
Figure 14:
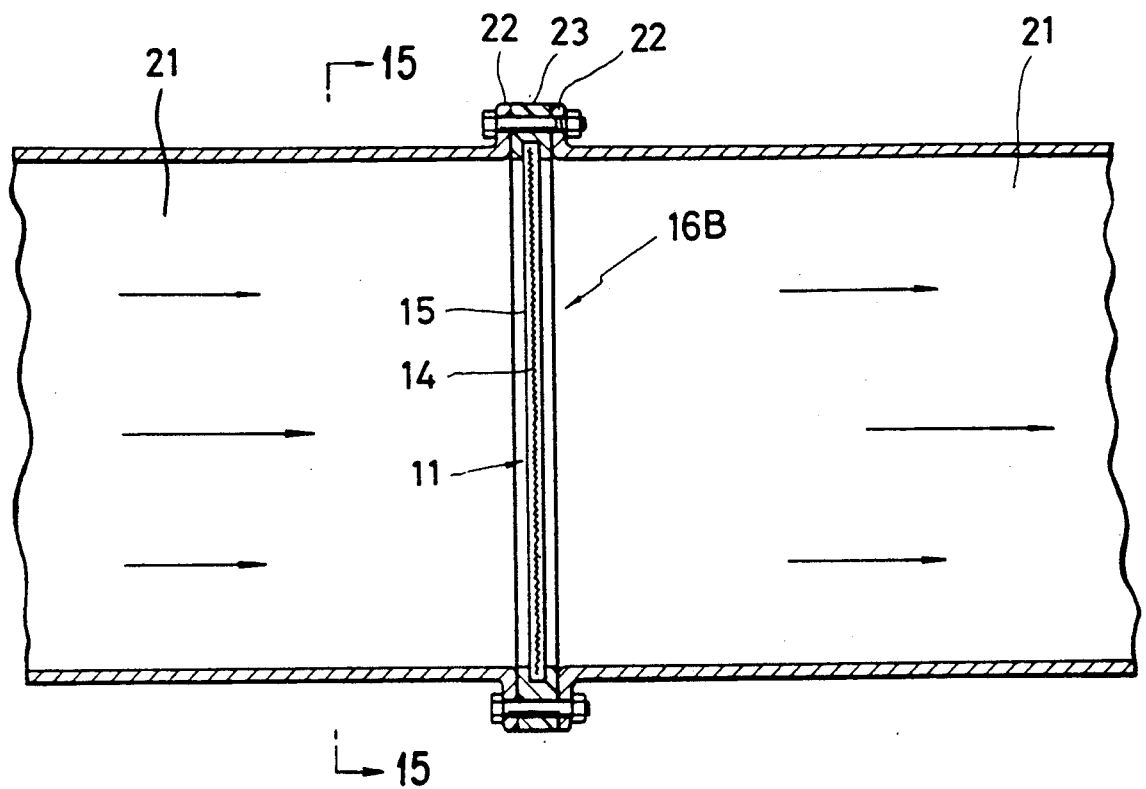
Figure 15:
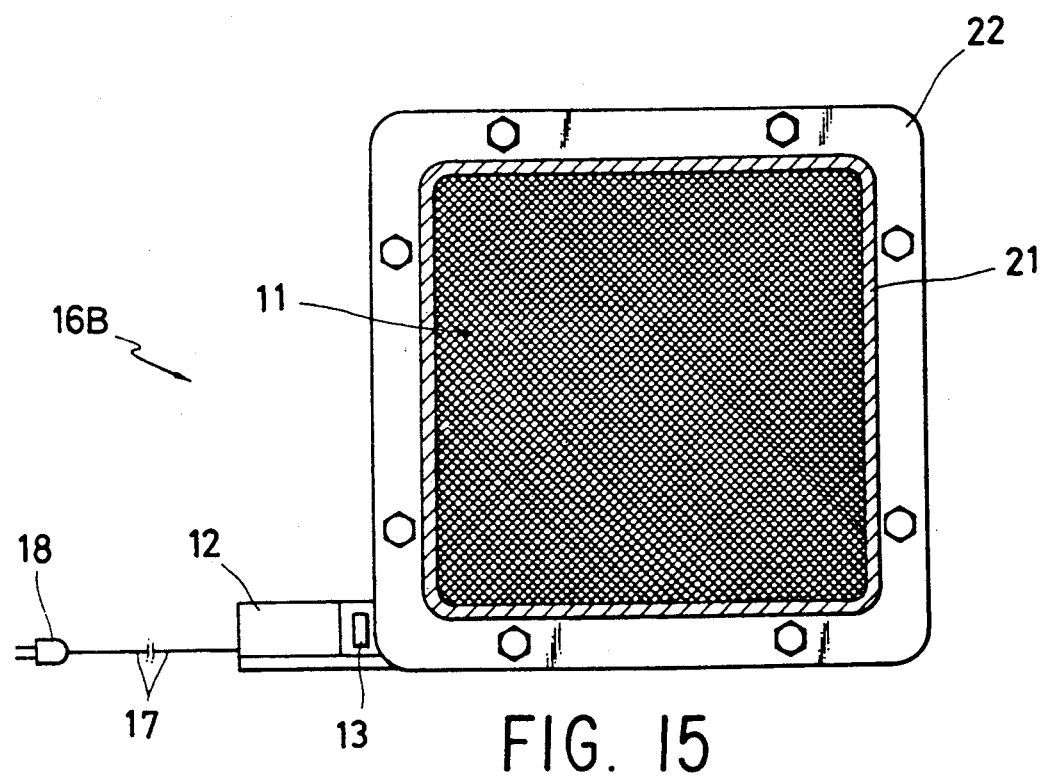
Figure 16:
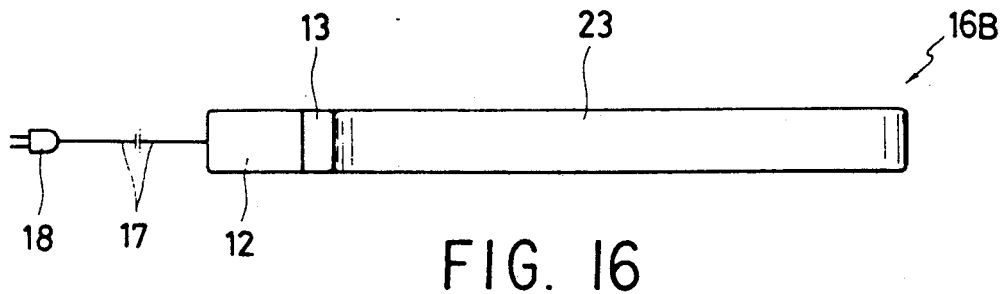
Figure 17:
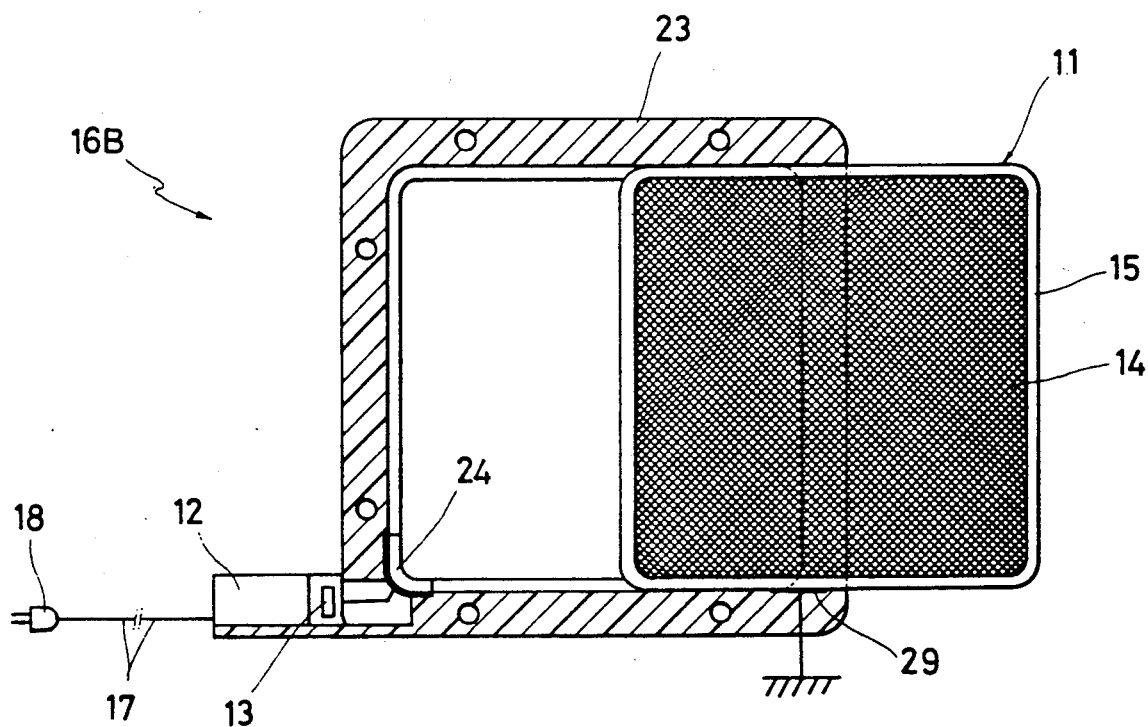

In the embodiments shown in FIGS. 11-13 inclusive, the significant difference from the embodiments of this invention is in a carbon filter body 11A of a carbon filter 20A. This carbon filter body 11A comprises a filter base 26 of conductive material having a number of fine holes 25 and carbon 27 fixed to cover the surface of the filter base 26.

It will be appreciated that it is possible to obtain the same effect even in case of comprising a carbon filter 20A by using a carbon filter body 11A arranged as described.

In the embodiments shown in FIGS. 14-17 inclusive, the significant difference from the embodiment of this invention is in being provided with a filter mount 23 of frame style made of conductive material between flanges 22, 22 at a joint of a duct 21, a carbon filter body 11 mounted removably in the filter mount 23, a plug socket 24 engaged with an outer frame 15 of the carbon filter body 11 provided in the filter mount 23 and an AC adapter 12 as a voltage impressing apparatus for impressing positive voltage to the carbon filter body 11 through the plug socket 24 attached to the periphery of the filter mount 23. It will be appreciated that it is possible to remove ozone in the air flowing within a duct 21 even in case of an air cleaner 16B arranged as described.

Further, this air cleaner 16B may be mounted in a duct of an air conditioning system and the like.

Figure 18:
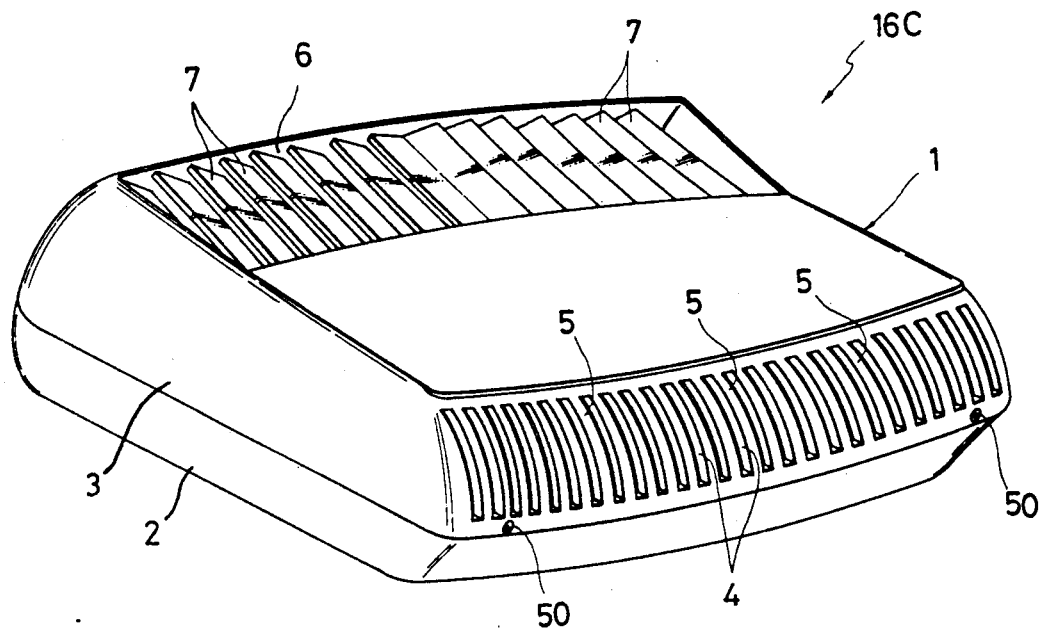
FIGS. 18 and 19 are explanatory views showing different embodiments of this invention respectively.
Figure 19:
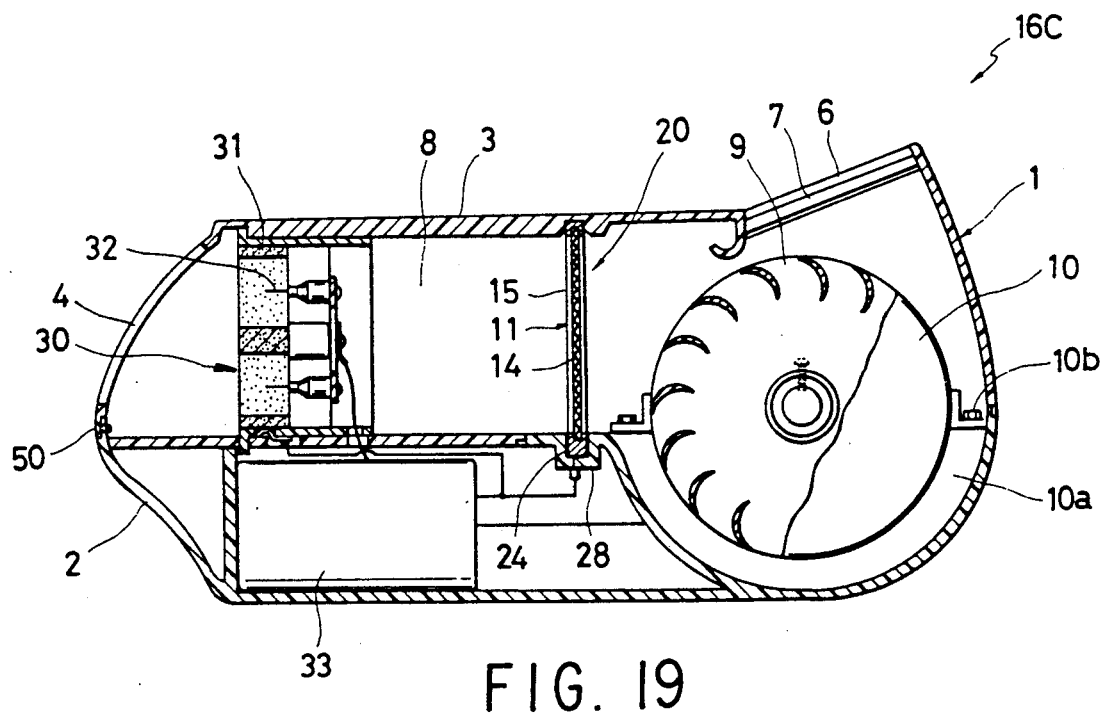

In the embodiments shown in FIGS. 18 and 19, the significant difference from the embodiments of this invention is that an electrifying apparatus 30 for charging ozone with electricity is mounted within an air path 8 upstream from a carbon filter body 11. It is possible to electrify ozone not yet charged, make ozone attach to a carbon filter body 11 and remove ozone surely by making an air cleaner 16C to be arranged as described.

The electrifying apparatus 30 comprises a dust collecting electrode 31 of cylindrical type mounted within an air path 8, discharge electrodes 32 mounted so that the end thereof is located within the dust collecting electrode 31 and a voltage impressing apparatus 33 for impressing high voltage to the discharge electrodes 32.

Further, having described our invention as related to the embodiment in case when positive voltage is impressed to a carbon filter body 11, it is our intention that the invention be not limited by any of the details of description, unless otherwise specified, but it is possible to impress negative voltage. In this case, it is required to be considered to keep safety.

As it is apparent from the above description, it is possible to obtain the effects of this invention as listed below:

(1) As the invention described in claim 1 comprises a case body, an air inlet formed in the case body, an air outlet formed in the case body, an air path formed in the case body for communication of the air outlet with the air inlet, one or more fans mounted within the air path in order to suck air from the air inlet and exhaust it from the air outlet, a carbon filter body mounted in the air path and a voltage impressing apparatus mounted in the case body for impressing a predetermined positive voltage to the carbon filter body, it is possible to remove ozone from the air containing charged ozone by making ozone to be adsorbed to a carbon filter and changed to oxygen and carbon dioxide. Accordingly, ozone which has a baneful influence upon the human body can be removed from the air.

(2) As it is enough to remove ozone by only making air to pass through a carbon filter for the reason described in the above item (1), it is possible to remove ozone efficiently in a short time.

(3) As the construction of a carbon filter is simple for the reason described in the above item (1), it is possible to manufacture a carbon filter easily.

(4) As it is possible to remove ozone easily in a short time even in case of the apparatus by which ozone is generated, it is possible to use the apparatus without anxity. It is possible to intend to enlarge a field of utilization and use of ozone generating apparatus.

(5) As it is possible to obtain the same effect as described in the above items (1)-(4) inclusive even in the invention described in claims 2, 3 and 4 and also it is possible to make ozone to be charged compulsorily in the invention described in claim 2, it is possible to make ozone not yet charged to be electrified and be removed surely by a carbon filter.

(6) As the invention described in claim 5 comprises a carbon filter body having a number of fine holes allowing the passage of air flow therethrough and a voltage impressing apparatus for impressing a predetermined positive voltage to the carbon filter body, it is possible to remove charged ozone in the air flowing through the duct for ventilation of a room, an air cleaner, an air conditioning system, etc. by mounting it in the duct.

(7) As it is simple to manufacture an air filter for the reason described in the item (6), it is possible to manufacture it economically.

(8) In the invention described in claim 6, it is possible to obtain the same effects as described in the items (6) and (7).

What is claimed is:

1. An air cleaner comprising a case body, an air inlet in said case body, an air outlet in said case body, an air path in said case body for communication of air between said air outlet and said air inlet, at least one fan mounted within said air path in order to suck air from said air inlet and exhaust it from said air outlet, a carbon filter body mounted in said air path, a source of voltage having a positive terminal mounted in said case body, said source of voltage comprising means for applying a positive voltage substantially from 6 to 24 volts between said positive terminal and a ground, and means for connecting said carbon filter body between said positive terminal and said ground for impressing said positive voltage to said carbon filter body.

2. An air cleaner comprising a case body, an air inlet in said case body, an air outlet in said case body, an air path in said case body for communication of air between said air outlet and said air inlet, at least one fan mounted within said air path in order to suck air from said air inlet and exhaust it from said air outlet, means for electrically charging ozone mounted in said air path, a carbon filter body mounted in said air path downstream from said electrifying apparatus in said air path, a source of voltage having a positive terminal mounted in said case body, said source of voltage comprising means for applying a positive voltage substantially from 6 to 24 volts between said positive terminal and a ground, and means for connecting said carbon filter body between said positive terminal and said ground for impressing said positive voltage to said carbon filter body.

3. An air cleaner comprising a case body, an air inlet in said case body, an air outlet in said case body, an air path in said case body for communication of air between said air outlet and said air inlet, at least one fan mounted within said air path in order to suck air from said air inlet and exhaust it from said air outlet, a dust removing filter mounted removably in said case body in order to screen said air inlet to be able to keep air flow passing therethrough, a carbon filter body mounted removably in said air path which is able to keep air flow passing therethrough, a source of a voltage having a positive terminal mounted in said case body, said source of voltage comprising means for applying a positive voltage substantially from 6 to 24 volts between said positive terminal and a ground, and means for connecting said carbon filter body between said positive terminal and said ground for impressing said positive voltage to said carbon filter body.

4. An air cleaner comprising a filter mount provided in a duct, a carbon filter body mounted removably in said filter mount and insulated from said duct and positioned to be able to keep air flow passing therethrough, a source of a low direct voltage substantially from 6 to 24 volts connected to apply said voltage as a positive voltage to said carbon filter body, and means for passing air through said filter while said voltage is applied thereto.

5. An air filter comprising a carbon filter body having a number of fine holes allowing the passage of air therethrough, a source of a low direct voltage substantially from 6 to 24 volts connected to apply said voltage as a positive voltage to said carbon filter body, and means for passing air through said filter while said voltage is applied thereto.

6. An air filter comprising a carbon filter body made from fibrous carbon or activated carbon allowing the passage of air therethrough, a source of a low direct voltage substantially from 6 to 24 volts connected to apply said voltage as a positive voltage to said carbon filter body, and means for passing air through said filter while said voltage is applied thereto.

* * * * *